(12) United States Patent
Shimizu et al.

(10) Patent No.: US 12,565,262 B2
(45) Date of Patent: *Mar. 3, 2026

(54) CONTROL DEVICE FOR VEHICLE

(71) Applicant: HONDA MOTOR CO., LTD., Tokyo (JP)

(72) Inventors: Takuro Shimizu, Tokyo (JP); Shotaro Yamazaki, Tokyo (JP); Masayuki Ueno, Tokyo (JP); Shogo Nishizawa, Tokyo (JP); Yosuke Ojima, Tokyo (JP); Munetsugu Hanji, Tokyo (JP); Hisanori Yanagida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 18/240,409

(22) Filed: Aug. 31, 2023

(65) Prior Publication Data

US 2023/0406405 A1 Dec. 21, 2023

Related U.S. Application Data

(63) Continuation of application No. 17/679,513, filed on Feb. 24, 2022, now Pat. No. 11,780,493.

(30) Foreign Application Priority Data

Mar. 31, 2021 (JP) ................................. 2021-061962
Jun. 21, 2021 (JP) ................................. 2021-102156

(51) Int. Cl.
B60W 10/20 (2006.01)
B62D 5/04 (2006.01)
B62D 6/02 (2006.01)
(52) U.S. Cl.
CPC ............. B62D 5/0484 (2013.01); B62D 6/02 (2013.01)

(58) Field of Classification Search
CPC ...... B62D 5/0484; B62D 6/02; B62D 15/025; B62D 15/0265; B62D 5/003; B62D 5/005;

(Continued)

(56) References Cited

U.S. PATENT DOCUMENTS 5,225,982 A * 7/1993 Ito ........................... B60K 28/16
701/91
5,341,891 A * 8/1994 Wada ................... B62D 5/0478
318/434

(Continued)

FOREIGN PATENT DOCUMENTS

CN 110040176 A 7/2019
DE 3704406 A1 8/1987
(Continued)

OTHER PUBLICATIONS

Notice of Reasons for Refusal for Japanese Patent Application No. 2021-102156 dated Aug. j20, 2024; 6 pp.

*Primary Examiner* — B M M Hannan
(74) *Attorney, Agent, or Firm* — Armstrong Teasdale LLP

(57) ABSTRACT

A control device for a vehicle equipped with a steering system including a steering wheel (13), a rack (12) for steering the wheels (4) of the vehicle, and a redundant arrangement for transmitting a displacement of the steering wheel to the rack, wherein upon detecting a failure in the redundant arrangement, the control device sets an upper limit speed to a first value in a first stage, and changes the upper limit speed from the first value to a second value smaller than the first value in a progressive manner in a second stage that follows the first stage.

9 Claims, 6 Drawing Sheets

(58) Field of Classification Search
 CPC ..... B62D 5/0481; B60W 10/18; B60W 10/20;
  B60W 50/0205; B60W 50/029; B60W
  50/038; B60W 10/04; B60K 31/00; B60K
  2031/0091; B60R 16/03
 USPC .......................................................... 701/41
 See application file for complete search history.

(56) References Cited

U.S. PATENT DOCUMENTS

| | | | | |
|---|---|---|---|---|
| 9,771,074 | B2 | 9/2017 | Azuma et al. | |
| 10,759,472 | B2 | 9/2020 | Kodera | |
| 2002/0013647 | A1* | 1/2002 | Kawazoe | B60W 30/18145 |
| | | | | 180/443 |
| 2004/0090117 | A1* | 5/2004 | Dudeck | B60W 30/0953 |
| | | | | 303/193 |
| 2006/0042859 | A1* | 3/2006 | Itoh | B62D 5/003 |
| | | | | 180/402 |
| 2011/0060505 | A1* | 3/2011 | Suzuki | B60T 7/12 |
| | | | | 701/41 |
| 2011/0190972 | A1* | 8/2011 | Timmons | G08G 1/167 |
| | | | | 701/31.4 |
| 2012/0016562 | A1* | 1/2012 | Tetsuka | F02D 11/02 |
| | | | | 701/93 |
| 2012/0092938 | A1* | 4/2012 | Akahori | G11C 7/14 |
| | | | | 365/189.09 |
| 2014/0358352 | A1 | 12/2014 | Yamamoto et al. | |
| 2015/0291210 | A1* | 10/2015 | Kageyama | B62D 5/04 |
| | | | | 701/41 |
| 2015/0367833 | A1* | 12/2015 | Maeda | B60K 6/547 |
| | | | | 903/917 |
| 2016/0159388 | A1 | 6/2016 | Sekiya | |
| 2016/0244070 | A1 | 8/2016 | Bendewald et al. | |
| 2017/0076606 | A1 | 3/2017 | Gupta et al. | |
| 2017/0197656 | A1* | 7/2017 | Oh | B62D 6/008 |
| 2017/0267221 | A1 | 9/2017 | Hecker et al. | |
| 2018/0086379 | A1* | 3/2018 | Beer | B62D 15/025 |
| 2018/0148088 | A1* | 5/2018 | Katayama | B62D 5/0484 |
| 2019/0152513 | A1* | 5/2019 | Awan | B62D 5/003 |
| 2019/0168807 | A1 | 6/2019 | Polmans | |
| 2020/0391747 | A1 | 12/2020 | Ohmura et al. | |
| 2020/0391793 | A1 | 12/2020 | Loussaut et al. | |
| 2021/0129831 | A1 | 5/2021 | Hecker et al. | |
| 2021/0237719 | A1* | 8/2021 | Chen | F02D 11/107 |
| 2022/0111895 | A1 | 4/2022 | Schumann et al. | |
| 2022/0134885 | A1* | 5/2022 | Shimizu | B60L 3/0092 |
| | | | | 701/41 |
| 2022/0289288 | A1 | 9/2022 | Hultén et al. | |
| 2022/0297747 | A1 | 9/2022 | Polmans et al. | |
| 2022/0315100 | A1 | 10/2022 | Shimizu et al. | |

FOREIGN PATENT DOCUMENTS

| | | | |
|---|---|---|---|
| DE | 102013217136 | A1 | 3/2015 |
| DE | 112018005154 | T5 | 7/2020 |
| JP | 2004168257 | A | 6/2004 |
| JP | 5013312 | B2 | 8/2012 |
| JP | 2013158174 | A | 8/2013 |
| JP | 2014213810 | A | 11/2014 |
| KR | 20180089503 | A | 8/2018 |

* cited by examiner

*Fig.4* vehicle system

Figure 4:
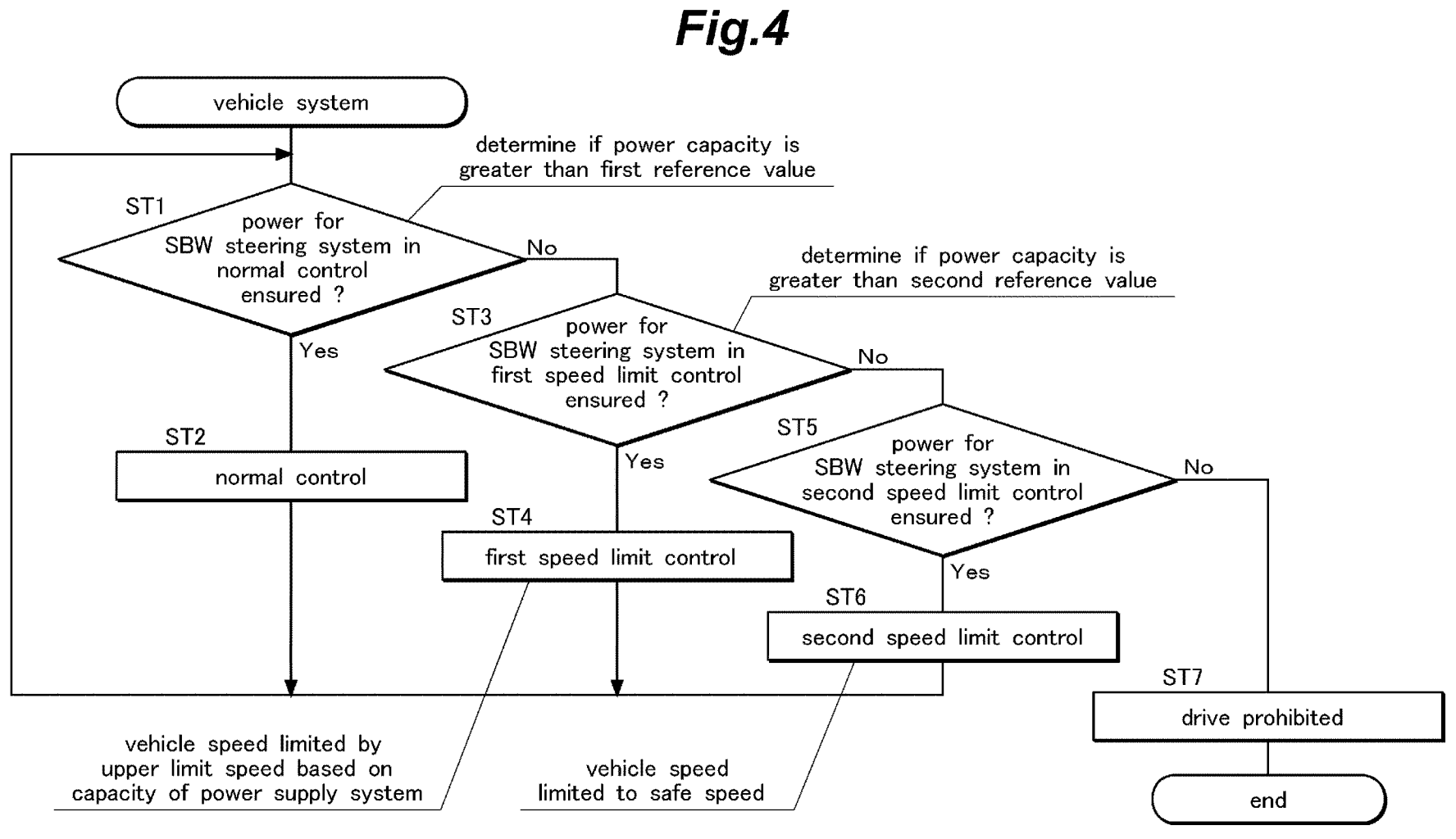

ST1 — power for SBW steering system in normal control ensured ?

Yes

ST2 — normal control vehicle speed limited by upper limit speed based on capacity of power supply system No determine if power capacity is greater than first reference value ST3 — power for SBW steering system in first speed limit control ensured ?

Yes

ST4 — first speed limit control

No determine if power capacity is greater than second reference value

ST5 — power for SBW steering system in second speed limit control ensured ?

Yes

ST6 — second speed limit control vehicle speed limited to safe speed

No

ST7 — drive prohibited end stepwise
speed limit control forced deceleration
control forced stop
control

CONTROL DEVICE FOR VEHICLE

CROSS REFERENCE TO RELATED APPLICATIONS

This application is a continuation application of U.S. patent application Ser. No. 17/679,513, filed Feb. 24, 2022, which is incorporated herein by reference in its entirety. U.S. patent application Ser. No. 17/679,513 claims priority to Japanese Patent Application No. 2021-061962 filed on Mar. 31, 2021, and Japanese Patent Application No. 2021-102156 filed on Jun. 21, 2021.

TECHNICAL FIELD

The present invention relates to a control device for controlling a steer-by-wire steering system for a vehicle.

BACKGROUND ART

In a steer-by-wire (SBW) steering system, the steering wheel operated by the driver and the rack for steering the wheels are mechanically separated from each other, and the wheels are steered by a steering actuator according to a steering angle of the steering wheel detected by a steering angle sensor.

To ensure a high reliability in a steer-by-wire steering system, the system is typically provided with a redundant arrangement, or is arranged so that multiple modes of steering operation are possible. For instance, if the steering actuator such as an electric motor which is normally employed to steer the wheels should fail, the steering wheel is mechanically connected to the rack by a clutch so that the wheels may be steered manually. However, once redundancy is lost, it is not advisable to continue the operation of the vehicle, but to move the vehicle to a curb or other safe locations.

According to a known technology for controlling a steer-by-wire steering system in the case of an abnormal condition such as a failure in the power generator, upon detecting a failure in the power generator, the vehicle speed is limited so that the consumption of electric power may be reduced, and the electric power necessary to operate the steering actuator to safely maneuver the vehicle may be secured. See JP5013312B2, for instance.

When redundancy of a steer-by-wire steering system is lost due to a failure of a component of the system, there is a need to move the vehicle to a safe location such as a curb, a parking area or a repair shop without causing any hazard to other vehicles or without disrupting the traffic. Simply limiting the vehicle speed is not a practical solution.

SUMMARY OF THE INVENTION

In view of such a problem of the prior art, a primary object of the present invention is to provide a vehicle control device that allows the vehicle to be moved to a safe location smoothly without disrupting the traffic in case of a failure in a steer-by-wire steering system.

To achieve such an object, the present invention provides a control device (21) for a vehicle equipped with a steering system (11) including an operating member (13) configured to be operated by a driver, a steering member (12) configured to steer wheels (4) of the vehicle, and a redundant arrangement for transmitting a displacement of the operating member to the steering member, wherein upon detecting a failure in the redundant arrangement, the control device sets an upper limit speed to a first value in a first stage, and changes the upper limit speed from the first value to a second value smaller than the first value in a progressive manner in a second stage that follows the first stage.

Thus, when a failure occurs in the redundant arrangement in the steer-by-wire steering system, the vehicle is prevented from traveling at a high speed, but is still capable of traveling at a reduced speed so that the vehicle operator can perform a necessary maneuver such as a lane change and cornering. Therefore, the vehicle operator can bring the vehicle to a safe location without disrupting the traffic. If desired, the control device may further change the upper limit speed from the second value to a third value lower than the second value in a progressive manner in a third stage that follows the second stage.

Preferably, the steering device includes a reaction force generator (17) that applies a reaction force to the operating member, and a steering device (16) that steers the wheels, and the redundant arrangement is provided in each of the reaction force generator and the steering device, a failure in the redundant arrangement being detected when a failure is detected in at least one of the reaction force generator and the steering device.

Thus, when a failure in the redundant arrangement of at least one of the two parts of the steering system is detected, the vehicle speed is properly controlled for safe handling of the vehicle so that the reliability of the vehicle can be improved. The reaction force generator may consist of a reaction force actuator, and the steering device may consist of a steering actuator.

Preferably, the first value for the upper limit speed is selected as a higher of a legal speed limit of a road on which the vehicle is traveling and a current speed of the vehicle when the failure is detected.

Thus, when the vehicle speed of the own vehicle at the time of detecting the failure is higher than the legal speed limit of the road on which the vehicle is traveling, the vehicle speed of the own vehicle at the time of detecting the failure is set as the value of the upper limit speed. As a result, sudden deceleration of the vehicle can be avoided, and the vehicle can be maneuvered to a safe location in a smooth manner. On the other hand, when the vehicle speed of the own vehicle at the time of detecting the failure is lower than the legal speed limit of the road on which the vehicle is traveling, the legal speed limit is set as the value of the upper limit speed. As a result, the vehicle is caused to travel at a speed similar to those of other vehicles on the road so that the own vehicle can be maneuvered to a safe location without disrupting the traffic.

Preferably, the upper limit speed in the second stage is set at a speed which is attained by a deceleration of the vehicle that takes place without the driver operating an accelerator pedal or a brake pedal.

Thereby, the speed of the own vehicle can be reliably reduced to the second value within a reasonable amount of time without requiring any operation by the driver. The deceleration may be caused by engine brake, regenerative brake, friction or any combination of these. The rate of deceleration should be such that the driver is enabled to steer the vehicle in a comfortable manner.

Preferably, when the vehicle speed of the own vehicle is contained within a speed region of a predetermined width defined below the upper limit speed, an acceleration of the vehicle is prohibited from being higher than a predetermined value.

Thereby, when the vehicle speed is near the upper limit speed, excessive acceleration is prohibited so that the own vehicle is prevented from suddenly accelerating, and the vehicle speed is prevented from temporarily exceeding the upper limit speed.

Preferably, when the vehicle speed of the own vehicle exceeds the upper limit speed, a drive force of a power plant (5) of the vehicle is limited.

Thereby, when the vehicle speed of the own vehicle exceeds the upper limit speed, the vehicle speed of the own vehicle can be quickly reduced to the upper limit speed or less. In addition, in order to reduce the vehicle speed below the upper limit speed quickly enough, braking by regeneration or friction may be used at the same time.

Preferably, the vehicle is controlled normally when a power capacity of a power supply system of the vehicle is equal to or higher than a first level, is controlled with a first upper limit speed determined according to the power capacity of the power supply system when the power capacity of the power supply system is lower than the first level and equal to or higher than a second level which is lower than the first level, and is controlled with a second upper limit speed lower than the first upper limit speed when the power capacity of the power supply system is lower than the second level.

Thereby, even if a failure occurs in the steering system that nullifies the redundant arrangement thereof, the electric power required to safely bring the vehicle to a stop is ensured by limiting the vehicle speed according to the remaining capacity of the power supply system. In addition, if the power condition deteriorates even further so to increase the effort to steer the vehicle even with the first upper limit speed, the upper limit speed is further reduced to the second upper limit speed so that the vehicle may be brought to a stop promptly when required. For safe handling of the vehicle, the power capacity of the power supply system is desired to be adequate to accelerate the vehicle to the first reference speed or the second reference speed when operating the vehicle with the first upper limit speed and second upper limit speed, respectively, while ensuring the steering system, the brake system and other essential functions of the vehicle to be operated. When the vehicle is operated with an upper limit speed in this manner, it is desirable to shut off any non-essential electric devices on board in order to minimize power consumption.

Preferably, in a case where vehicle is provided with a power generator (33), and a failure of the power supply system is detected, the control device progressively lowers an upper limit speed of the vehicle when the power generator can adequately power the steering system, lowers the upper limit speed of the vehicle to a safe speed when the power generator cannot adequately power the steering system, and brings the vehicle to a stop when the power generator is unable to power the steering system.

Thereby, even if the power supply system is faulty, if electric power can be supplied by power generation, since no immediate difficulty is anticipated, the upper limit speed may be reduced progressively, for instance in a stepwise manner, so that the vehicle may be brought to a safe location in a smooth manner. However, if electric power cannot be supplied by a power generator, there may be a chance that the steering system may fail to operate properly over time. Therefore, by promptly decelerating or bringing the vehicle to a stop, the safety of the vehicle can be enhanced.

Preferably, the control device is configured to distinguish a plurality of modes of failure of the steering system, and when two or more modes of failure are detected simultaneously, sets the upper limit speed to a lowest of the upper limit speeds associated the two or more modes of failure.

Since the control device is able to distinguish a plurality of modes of failure of the steering system, the control device is able to cope with a wide range of failure issues. By selecting the lower upper limit speed in case of detecting two or more modes of failure, a high level of safety can be ensured.

Preferably, the vehicle is further equipped with a power supply system for supplying electric power to the steering system, the power supply system being provided with a redundant arrangement, the failure in the redundant arrangement of the steering system including a failure in the redundant arrangement of the power supply system.

Thereby, when the redundant arrangement of the power supply system is nullified, as it means a nullification of the redundant arrangement of the steering system, the measure is taken as a case of a failure in the redundant arrangement of the steering system so that the reliability of the steering system is particularly enhanced.

Thus, the present invention provides a vehicle control device that allows the vehicle to be moved to a safe location smoothly without disrupting the traffic in case of a failure in a steer-by-wire steering system.

BRIEF DESCRIPTION OF THE DRAWINGS

FIG. 4 is a flowchart showing the process of changing the vehicle speed in the prudent mode operation;

DESCRIPTION OF THE PREFERRED EMBODIMENT(S)

A preferred embodiment of the present invention is described in the following with reference to the appended drawings.

Figure 1:
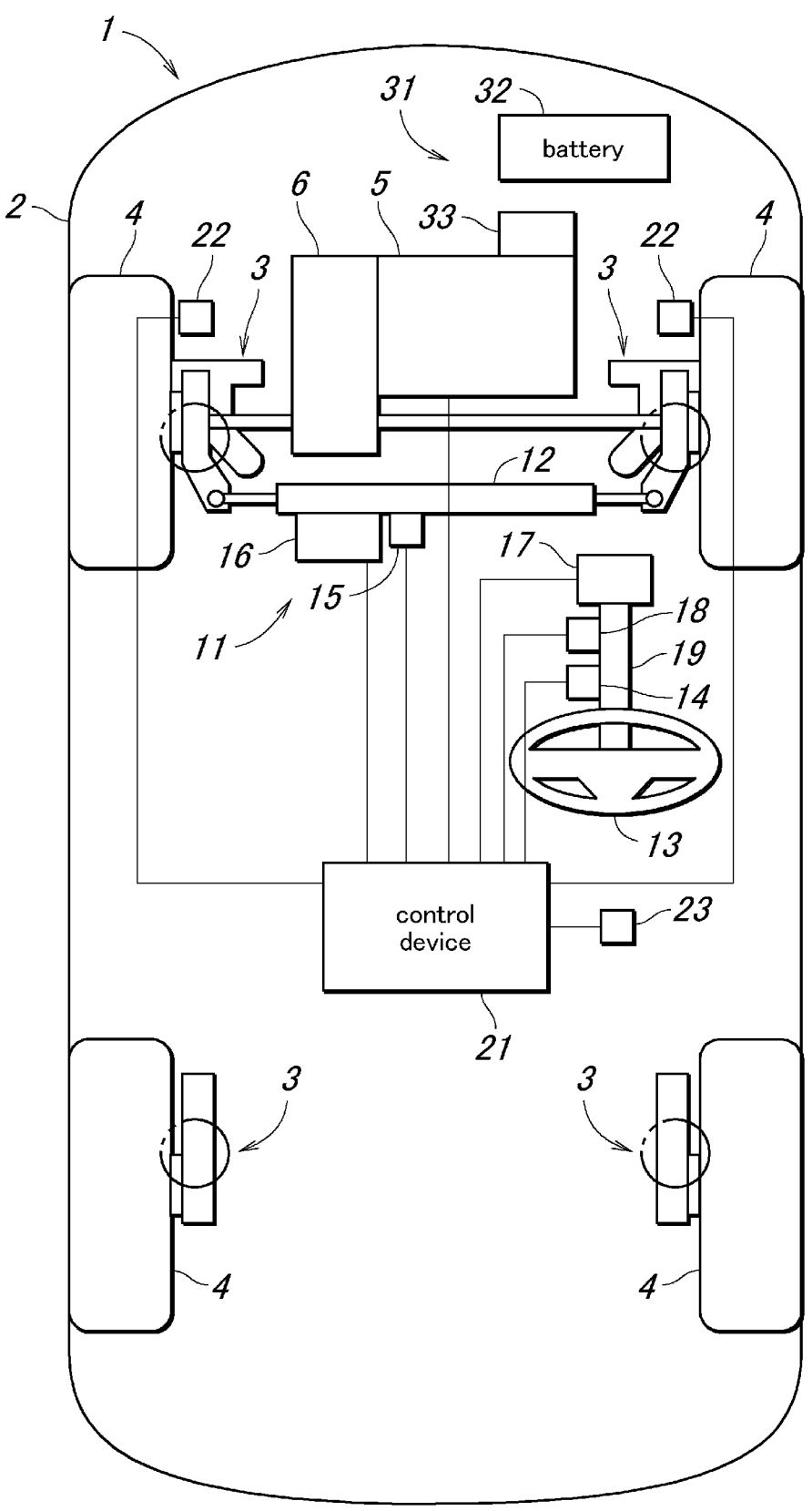
FIG. 1 is a schematic diagram of a vehicle fitted with a control device according to an embodiment of the present invention.

FIG. 1 is a schematic diagram of a vehicle 1 fitted with a control device 21 according to an embodiment of the present invention. The vehicle 1 of this embodiment consists of a four-wheeled vehicle having four wheels 4 supported by a vehicle body 2 by respective suspension devices 3.

The vehicle 1 is provided with a power plant 5 that drives the wheels 4 via a transmission device 6 that changes the mode of transmitting power from the power plant 5 to the wheels 4. The power plant 5 may include an internal combustion engine and/or an electric motor, and the driving force and braking force (engine brake) of the power plant 5 are transmitted to the wheels 4. The power plant 5 is controlled by an accelerator pedal operated by the driver. Further, the transmission device 6 is controlled by the shift operation of the driver.

The vehicle 1 is further provided with a steer-by-wire (SBW) steering system 11 for steering the wheels 4. The steering system 11 includes a rack 12 (steering member), a steering wheel 13 (operating member), a steering angle sensor 14, a steered angle sensor 15, a steering actuator 16 (steering device), a reaction force generator 17, and a steering torque sensor 18. The steering system 11 consists of a steer-by-wire steering system in which the rack 12 and the steering wheel 13 are normally mechanically disconnected from each other.

The steering wheel 13 is configured to be operated by a driver. The steering angle sensor 14 detects the angular position of the steering wheel 13. The steered angle sensor 15 detects the angular position of the steerable wheels 4. The steering actuator 16 pushes and pulls the rack 12 as required to steer the wheels 4. The reaction force generator 17 applies a reaction force to the steering wheel 13 in response to the operating force of the driver. The steering torque sensor 18 detects the steering torque acting on the steering shaft 19.

Further, the vehicle 1 is provided with a control device 21 (ECU), a vehicle speed sensor 22, and an acceleration sensor 23. The control device 21 is composed of a microprocessor, memory, and the like, and controls the steering actuator 16 and the reaction force generator 17 based on the detection results of sensors such as the steering angle sensor 14, the steered angle sensor 15, the steering torque sensor 18, the vehicle speed sensor 22, and the acceleration sensor 23.

Further, the vehicle 1 is provided with a power supply system 31 that supplies electric power to the steering system 11 and the control device 21. The power supply system 31 may include a battery 32, a power generator 33, and the like.

The vehicle 1 is also provided with a brake system (not shown in the drawings) for braking the wheels 4 typically but not exclusively controlled by the driver via a brake pedal.

To enhance the reliability of the vehicle, the steering system 11 is provided with a redundant arrangement which allows the steering system 11 to operate even when a failure in a component of the steering system 11 should occur. For example, the steering actuator 16 (steering device) may have two actuators so that in case of a failure in one of the actuators, the steering system 11 can continue to operate with the remaining actuator. Additionally or alternatively, the steering system 11 may be provided with a clutch that mechanically connects the steering wheel 13 with the rack 12 when the actuator(s) should fail so that the wheels 4 may be steered manually. Further, the reaction force generator 17 may have a redundant arrangement which may include two reaction force actuators. The redundant arrangement may be provided for the power supply system 31 for supplying electric power to the steering system 11. The redundant arrangement in this case may consist of a backup power source such as a battery provided separately from the main battery.

When a failure occurs in the steering system 11 which is provided with a redundant arrangement, the steering system 11 is able to continue to operate properly or with a reduced efficiency. However, in this situation, since the redundant arrangement is lost, and failure tolerance of the steering system 11 is reduced, it is desirable to operate the vehicle in a prudent manner. The control device 21 of this embodiment is configured to operate in a prudent operation mode in such a situation, and the details of the control action of the control device 21 in the prudent operation mode are described in the following with reference to FIGS. 2A and 2B.

When a failure occurs in the steering system 11, the prudent operation mode is initiated to allow the own vehicle to be moved to a safe location and to park thereat without disrupting the surrounding traffic. The safe location is preferably a curb or parking area where the own vehicle can be parked safely without obstructing the traffic or a driving lane where the own vehicle can continue to travel at a low speed without obstructing the traffic. In the example shown in FIG. 2A, since the passing lane is congested, the own vehicle is required to change lanes to the traveling lane before parking on a curb.

In this situation, since the vehicles in the congested lane are traveling at low speeds while the vehicles in the traveling lane are traveling at higher speeds, for the own vehicle to change lanes to the traveling lane without disrupting the traffic, it is necessary to accelerate to a speed close to those traveling in the traveling lanes.

At this time, if the speed of the vehicle is unconditionally limited due to an occurrence of a failure in the steering system 11, the own vehicle may not be able to change lanes to the traveling lane due to excessive speed differences to those traveling in the traveling lane. As a result, the own vehicle may not be able to move to the curb without disrupting the traffic.

Figures 2A, 2B:
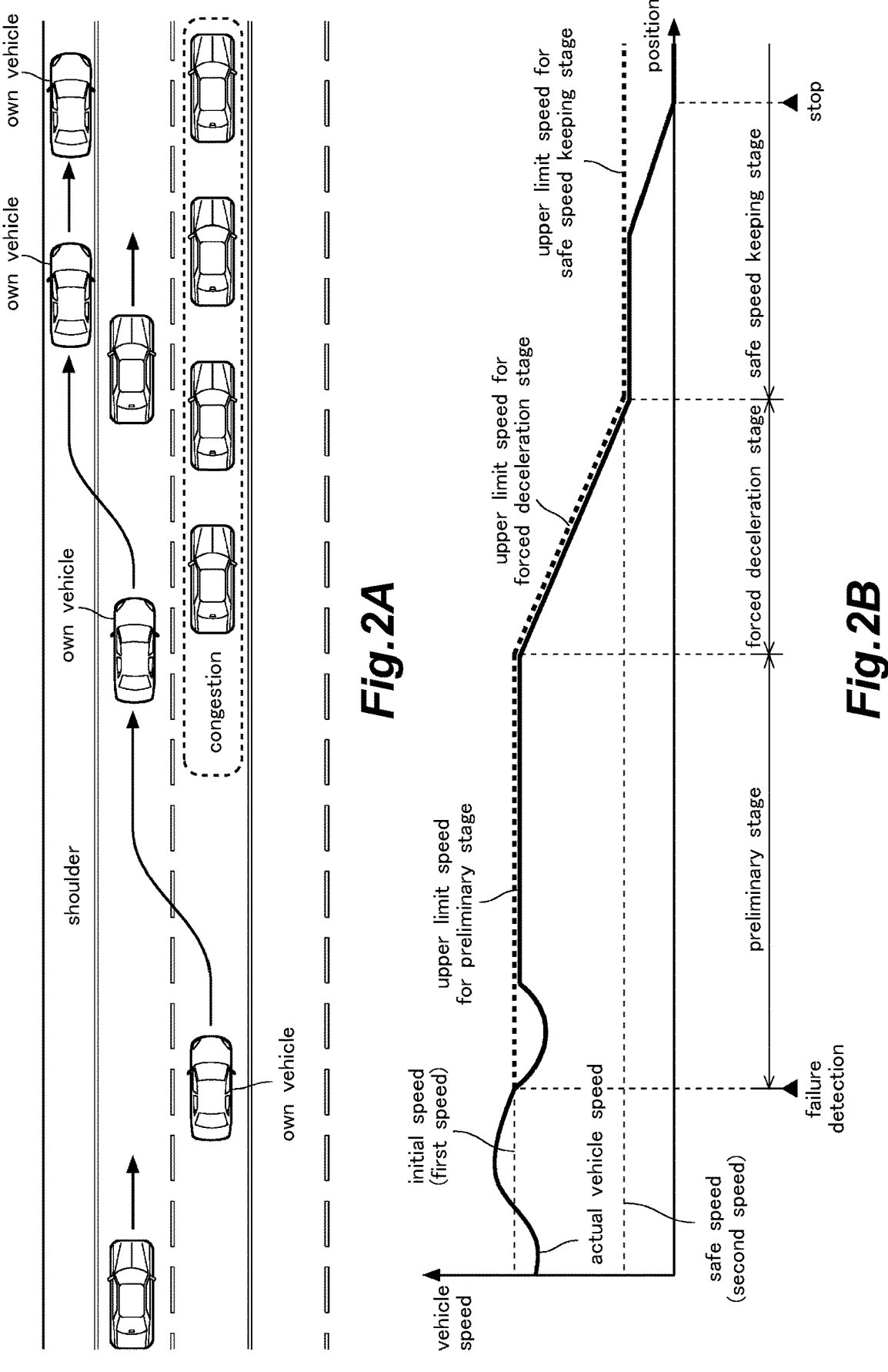
FIG. 2A is a diagram illustrating a typical maneuver of the vehicle in a prudent mode operation.
FIG. 2B is a graph showing the time history of the vehicle speed during the prudent mode operation.

Therefore, in the present embodiment, when a failure occurs to the steering system 11, and the redundant arrangement of the steering system 11 is nullified or otherwise impaired, the prudent operation mode is initiated. The prudent operation mode progresses in three stages. In the first stage (preliminary stage), the upper limit speed of the own vehicle is set to an initial speed (first value) or the speed at which the own vehicle was traveling when the failure of the steering system 11 was detected (or the legal speed limit of the road), and the own vehicle is prevented from traveling faster than the initial speed. In the second stage (forced deceleration stage), the upper limit speed of the own vehicle is progressively reduced from the initial speed to a prescribed safe speed (second value). The own vehicle may travel at the current upper limit speed or slower than the current upper limit speed. In the third stage (safe speed keeping stage), the upper limit speed of the own vehicle is set at the safe speed (second value). FIG. 2B shows the time history of the change in the upper limit speed in the prudent operation mode.

Once the safe speed keeping stage is reached, the driver looks for a safe location such as a parking area or a car repair shop or any other facility that can deal with the failure, and brings the vehicle to a stop at the safe location. For this purpose, the driver operates the vehicle in a normal way except for that the vehicle speed cannot be increased beyond the safe speed.

The control operation performed by the control device 21 will be described in the following with reference to FIG. 3.

When the control device 21 detects a failure of the steering system 11 that nullifies the redundant arrangement thereof, the control device 21 sets the first stage or the preliminary stage in which an initial speed is set at a higher of the current speed of the vehicle (when the failure of the steering system 11 is detected) and the legal speed limit, and the vehicle speed is controlled so as not to exceed the initial speed.

If the vehicle speed of the own vehicle at the time of detecting the failure is higher than the legal speed limit of the road on which the vehicle is traveling, the vehicle speed of the own vehicle at the time of detecting the failure is set as the initial speed, and the speed of the own vehicle is prevented from exceeding the initial speed. Thereby, the own vehicle is prevented from abruptly decelerating, and is allowed to maneuver in an appropriate manner without disrupting the surrounding traffic.

On the other hand, if the legal speed limit of the road is higher than the vehicle speed of the own vehicle at the time of detecting the failure, the legal speed limit of the road is set as the initial speed or the upper limit speed at this time. Thereby, the own vehicle is permitted to accelerate up to the legal speed limit of the road so that the vehicle is allowed to travel in harmony with the surrounding traffic. In particular, the vehicle is able to change lanes smoothly as a preliminary step to moving to a safe location without obstructing the surrounding traffic.

The legal speed limit of the road can be known by detecting traffic signs by using image recognition technology or by using a GPS in conjunction with map information.

Thus, in the preliminary stage, although traveling at an unnecessarily high speed is prohibited, the own vehicle can be accelerated within a reasonable range, and the driver can relatively freely maneuver the own vehicle. In particular, the vehicle speed may be selected such that changing lanes can be performed in a smooth manner. In other words, the driver is freely allowed to operate the vehicle so that the vehicle may be maneuvered to a safe location in a smooth manner.

Upon elapsing of a prescribed time period following the start of the preliminary stage, the forced deceleration stage (second stage) is initiated. In this forced deceleration stage, the upper limit speed is set so as to gradually or progressively decrease from the initial speed (first speed) to the safe speed (second speed), and the vehicle speed is controlled so as not to exceed the upper limit speed.

Here, the initial speed (first speed) is the upper limit speed in the preliminary stage which is given as the higher of the vehicle speed when the failure of the steering system 11 is detected and the legal speed limit of the road. The safe speed (second speed) is a speed at which the own vehicle can be stopped promptly and safely by the driver's brake operation without requiring the driver's steering.

The upper limit speed in the forced deceleration stage may be set as the vehicle speed which the vehicle is expected to take when the driver does not operate the accelerator pedal or brake pedal. This deceleration rate may be selected such that the driver can steer the vehicle in a comfortable manner. For example, the upper limit speed in the forced deceleration stage may be set at the vehicle speed which is achieved by the engine brake of the power plant 5. Further, depending on the desired deceleration, not only the engine brake but also the braking force due to regeneration or friction may be used jointly.

In this way, in the forced deceleration stage, the vehicle is typically decelerated by the engine brake (including regenerative braking). As a result, the own vehicle can be reliably decelerated to the safe speed (second speed) within a reasonable amount of time without the driver performing the braking operation.

In the present embodiment, the deceleration level in the forced deceleration stage which is effected by the use of engine brake is fixed in value without regard to the initial speed. Therefore, the time duration of the forced deceleration stage typically gets shorter with a decrease in the initial speed.

Figure 3:
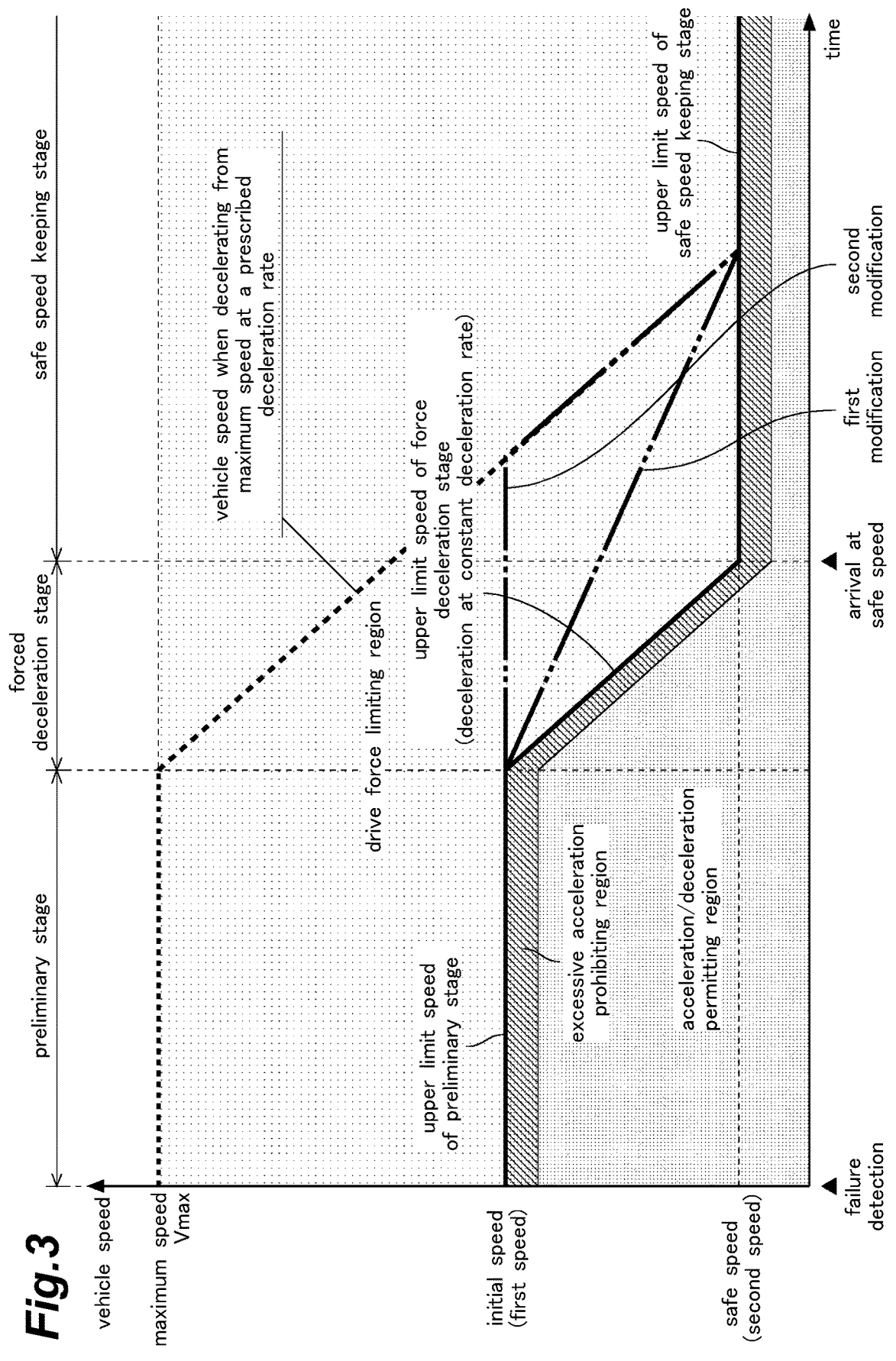
FIG. 3 is a diagram showing the principle of changing the vehicle speed in the prudent mode operation.

As shown in FIG. 3, according to a modified embodiment of the present invention shown as a first modification in FIG.

3, the time duration of the forced deceleration stage is constant without regard to the initial speed. In this case, the lower the initial speed, the smaller the deceleration level becomes. In this case, the time duration of the forced deceleration stage is selected to be equal to the time duration which is required for the vehicle traveling at a prescribed maximum speed Vmax to decelerate to the safe speed at a prescribed deceleration rate. FIG. 3 further shows a second modification where the time duration of the preliminary stage is equal to the time duration which is required for the vehicle traveling at a prescribed maximum speed Vmax to decelerate to the current speed at a prescribed deceleration rate, and the deceleration rate during the forced deceleration stage is fixed in value without regard to the initial speed. In this case, the time duration of the preliminary stage is the shortest when the initial speed is at the highest possible value (Vmax).

Once the vehicle speed drops to the safe speed (second speed) in the forced deceleration region, the safe speed keeping stage is initiated. In the safe speed keeping stage, the upper limit speed is set to the safe speed, and the vehicle speed is controlled so as not to exceed this upper limit speed.

The safe speed (second speed) is a speed at which the own vehicle can be brought to a stop promptly and safely by the driver's brake operation without requiring the driver's steering. In other words, in the safe speed keeping state, even if the state of the steering system 11 has seriously worsened following the initial failure in the steering system that nullified the redundant arrangement, the vehicle speed is limited to the safe speed so that the driver is still able to maneuver the vehicle to a safe location, and bring the vehicle to a stop thereat.

Therefore, once the safe speed keeping stage is reached, the driver can drive the vehicle at a speed lower than the safe speed until an appropriate safe location is reached by using the brake pedal and the accelerator pedal as required. Even if the steering system fails complete, the driver is still able to bring the vehicle to a stop so as to avoid any serious situation from occurring.

The driver is able to accelerate and decelerate the vehicle as desired as long as the vehicle speed is within the speed region below the upper limit speed in the preliminary state, the forced deceleration stage, and the safe speed keeping stage. Therefore, the driver is able to maneuver the vehicle in a most appropriate manner under all conditions.

As shown in FIG. 3, an excessive acceleration prohibiting region having a prescribed width is defined below the upper limit speed in the preliminary stage, the forced deceleration stage and the safe speed keeping stage. In the excessive acceleration prohibiting region, the driver can accelerate the vehicle by stepping on the accelerator pedal, but the maximum acceleration that can be achieved is limited. As a result, the vehicle speed is prevented from temporarily exceeding the upper limit speed even when the accelerator is excessively depressed.

Further, as shown in FIG. 3, a drive force limiting region is defined above the upper limit speed in the preliminary stage, the forced deceleration stage and the safe speed keeping stage. In the drive force limiting region, the drive force of the power plant 5 is limited without regard to the accelerator pedal operation of the driver. Therefore, if the vehicle speed exceeds the upper limit speed, the vehicle speed can be quickly brought down below the upper limit speed. If the vehicle speed significantly exceeds the upper limit speed for any reason, regenerative and/or frictional brake may be applied to the vehicle in addition to the engine brake so that the vehicle speed may be brought below the upper limit speed in as short a time period as possible.

The control action of the control device of the present embodiment will be described with reference to FIG. 4 showing a flow chart of an operating procedure of the control device 21 of the vehicle system.

Even if there is no failure in the steering system 11 itself, the power supply system 31 may temporarily become unable to provide the required power to the steering system 11. Such a state of the power supply system 31 may occur when the battery 32 forming the power supply system 31 for the steering system 11 is faulty, the output of the battery 32 is lowered due to a low ambient temperature, or the state of charge of the battery 32 is not adequate (which could occur due to deterioration of the battery 32 or the failure to properly charge the battery 32).

In such a case, the reliable operation of the steering system 11 cannot be expected, and the driver may not be able to steer the vehicle as required. As a result, the prudent mode operation may not be executed as designed.

Therefore, in the present embodiment, the control method is switched according to the magnitude of the power supply system 31 that supplies power to the steering system 11. However, the state of the power supply system 31 may not be known immediately after the vehicle system is started. It is therefore desirable to prohibit the operation of the vehicle or limit the vehicle speed so as not to exceed a prescribed safe speed until the power supply system 31 is determined to be in proper order.

More specifically, as shown in FIG. 4, when the vehicle system is activated, the control device 21 first determines if the required power of the steering system 11 during normal control is ensured, or in other words, if the electric power required for achieving and maintaining a safe state is ensured (step ST1). In particular, the control device 21 determines if the available electric power is adequate for the vehicle to be driven at a safe speed and steered as required. This can be accomplished by determining if the electric power that can be supplied by the power supply system 31 is equal to or higher than a first reference electric power capacity. The first reference electric power capacity is a threshold value for determining if the required power of the steering system 11 during normal control is ensured.

Here, if the required power of the steering system 11 at the time of normal control is ensured (ST1: Yes), the normal control is executed (step ST2). The determination process in step ST1 may also be performed by determining if the state of charge of the power supply system 31 is equal to or higher than the first reference value.

On the other hand, if the required power of the steering system 11 during normal control is not guaranteed (ST1: No), then it is determined if the required power of the steering system 11 for a first vehicle speed limit control is ensured (step ST3). In the first vehicle speed limit control, the speed of the vehicle is limited to an upper limit speed which is defined according to the remaining charge of the power supply system 31. More specifically, in step ST3, it is determined if the power supply capacity of the power supply system 31 is equal to or greater than a second reference electric power capacity. Thus, the second reference electric power capacity is a threshold value for determining if the required electric power for the steering system in the first vehicle speed limit control is ensured. The determination process in step ST3 may also be performed by determining if the state of charge of the power supply system 31 is equal to or higher than a second reference value.

Here, when the required power of the steering system 11 at the time of the first vehicle speed limit control is ensured (ST3: Yes), the first vehicle speed limit control is executed (step ST4).

On the other hand, if the required power of the steering system 11 for the first vehicle speed limit control is not ensured (ST3: No), then it is determined if the required power of the steering system 11 during a second vehicle speed limit control is ensured (step ST5). This can be accomplished by determining if the electric power that can be supplied by the power supply system 31 is equal to or higher than a third reference electric power capacity. In the second vehicle speed limit control, the speed of the vehicle is limited to a safe speed which is typically lower than the upper limit speed in the first vehicle speed limit control. The third reference value is a threshold value for ensuring the electric power required for the second vehicle speed limit control. The determination process in step ST5 may be performed by determining if the state of charge of the power supply system 31 is equal to or higher than a third reference value.

If the required power of the steering system 11 for the second vehicle speed limit control is ensured (ST5: Yes), the second vehicle speed limit control is executed (step ST6).

On the other hand, if the required power of the steering system 11 for the second vehicle speed limit control is not ensured (ST5: No), the vehicle is prohibited from starting (step ST7).

As described above, in the present embodiment, since the vehicle speed is limited according to the state of charge of the power supply system 31 (the first vehicle speed limit control is performed), the electric power required for safely bringing the own vehicle to a stop can be ensured. When the vehicle speed gets higher, the electric power required to safely bring the own vehicle to a stop increases. Therefore, by setting the upper limit speed in the vehicle speed limit control according to the state of charge of the power supply system 31, the own vehicle can be safely brought to a stop in a reliable manner.

Further, in the present embodiment, if the power condition deteriorates to such an extent as to cause difficulty in steering the vehicle during normal driving condition or under the first vehicle speed limit control, the second speed limit control is initiated so that the vehicle speed is promptly lowered to the safe speed (second reference speed) and the vehicle can be safely brought to a stop.

Figure 5:
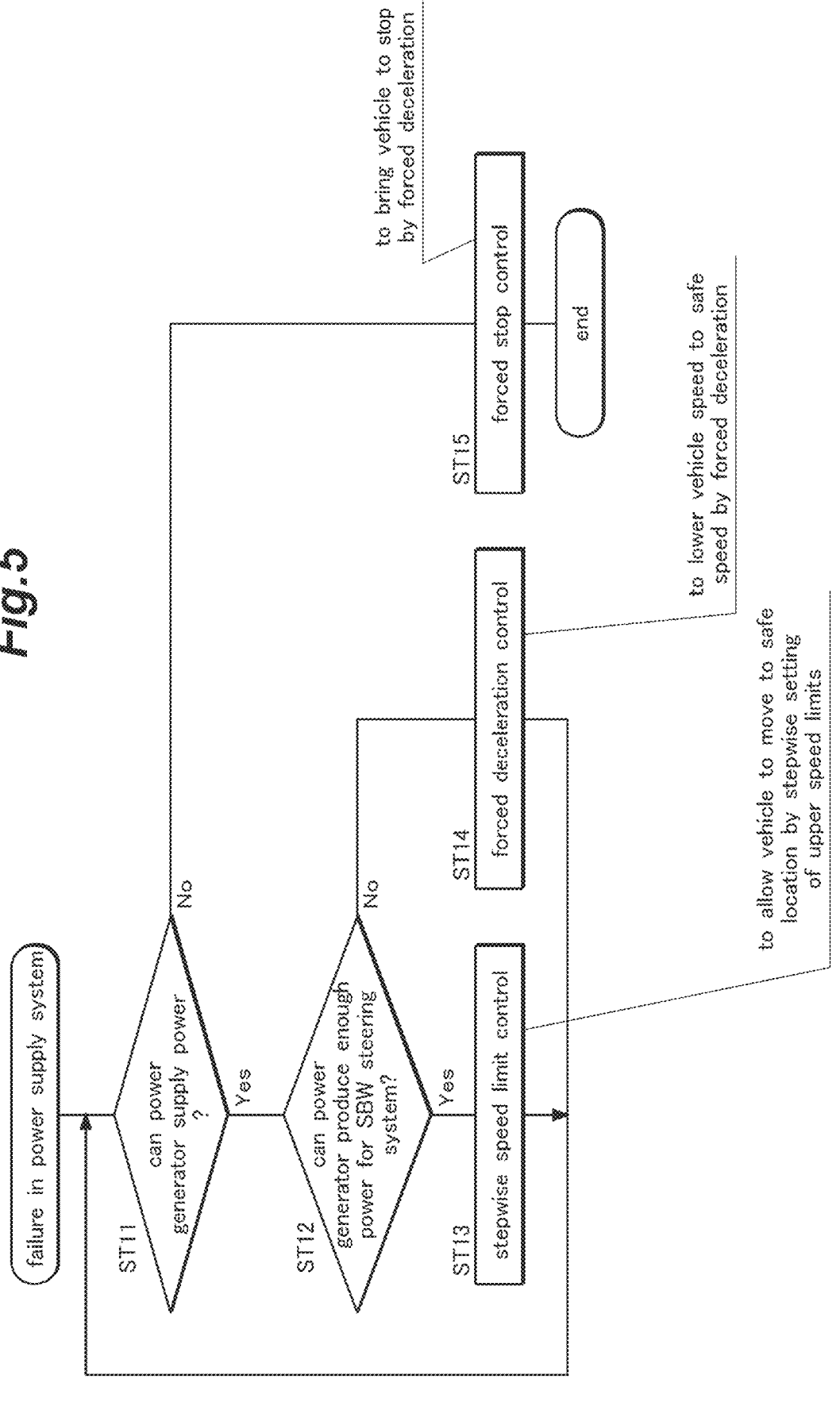
FIG. 5 is a flowchart showing the mode of operation of the control device in the case where the vehicle is provided with a power generator.
Figures 6A, 6B, 6C:
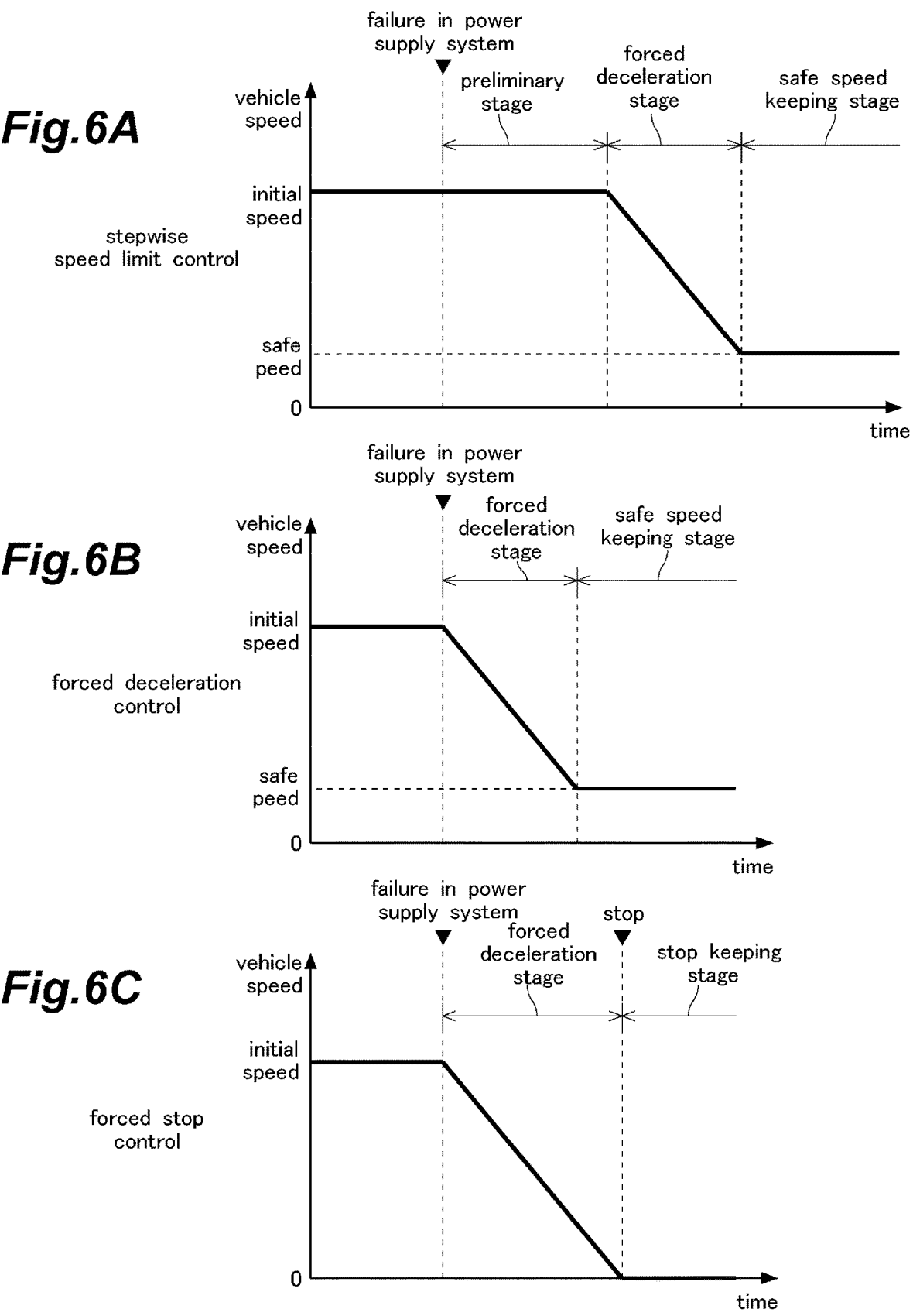
FIG. 6A is a graph showing the change in the upper limit speed with time in the case of a failure that nullifies the redundant arrangement of the power supply system—a stepwise vehicle speed limit control.
FIG. 6B is a graph showing the change in the upper limit speed with time in the case of a failure that nullifies the redundant arrangement of the power supply system—a forced deceleration control.
FIG. 6C is a graph showing the change in the upper limit speed with time in the case of a failure that nullifies the redundant arrangement of the power supply system—a forced stop control.

Next is described the control action which is executed upon occurrence of a failure (power failure) in the power supply system 31. FIG. 5 is a flowchart showing an operation procedure of the control device 21. FIGS. 6A to 6C are graphs showing an outline of the control action performed by the control device 21. FIG. 6A shows the case of a stepwise vehicle speed limit control, FIG. 6B shows the case of a forced deceleration control, and FIG. 6C shows the case of a forced stop control.

If a failure (power failure) occurs in the power supply system 31, the steering system 11 to which power is supplied by the power supply system 31 may not be able to operate normally due to lack of power so that a considerable effort may be required to drive the vehicle. This is a typical situation which the nullification of the redundant arrangement creates. It is therefore desirable to control the vehicle such that a safe speed keeping state or a stop keeping state is achieved before the steering becomes even more difficult.

More specifically, as shown in FIG. 5, when the control device 21 detects a failure (power failure) in the power supply system 31, it is then determined if power can be supplied by the power generator 33 (step ST11).

Here, if the power supply by the power generator 33 is possible (ST11: Yes), then it is determined if the power generator 33 is able to supply the required electric power for the steering system 11 (step ST12). If the battery 32 is deteriorated or the output of the battery 32 is reduced to a certain extent, the vehicle may be able to travel by the power supplied by the power generator 33, but the power supplied by the power generator 33 may not be adequate for operating the steering system 11 in a satisfactory manner.

Here, when the power generator 33 can adequately supply the electric power required by the steering system 11 (ST12: Yes), a stepwise vehicle speed limit control is performed (step ST13). In this stepwise vehicle speed limit control, as shown in FIG. 6A, three speed limit stages (preliminary stage, forced deceleration stage, and safe speed keeping stage) are sequentially produced so that the vehicle may be safely moved to a safe location such as a curb, road shoulder and a car repair shop.

On the other hand, if the power generator 33 is not able to produce the electric power required by the steering system 11 (ST12: No), a forced deceleration control is performed (step ST14). In this forced deceleration control, as shown in FIG. 6B, the own vehicle is forced to decelerate to a safe speed by progressively lowering the upper limit speed.

Further, when it becomes impossible for the own vehicle to travel by the electric power supplied by the power generator 33 (ST11: No), a forced stop control is performed (step ST15). In this forced stop control, as shown in FIG. 6C, the own vehicle is brought to a stop by progressively lowering the upper limit speed to zero. After the vehicle is brought to a stop, the stop holding function, specifically, an EPB (electric parking brake) or the park position of the transmission device 6 is employed to keep the own vehicle stationary.

As described above, even if the power supply system 31 becomes faulty, if the electric power can be supplied by power generator, the steer-by-wire steering system 11 does not immediately become unable to operate. Based on this recognition, in the present embodiment, under such a situation, the upper limit speed is progressively lowered so as to allow the own vehicle to be moved to a safe location in a smooth manner. On the other hand, if the power generator 33 becomes unable to supply the electric power for the steer-by-wire steering system 11, it may become difficult to steer the vehicle over time so that the own vehicle is decelerated promptly until the vehicle comes to a stop. Therefore, the safety of the own vehicle can be ensured.

A failure of a steer-by-wire steering system 11 can occur in a number of different ways, and how a failure of the steering system 11 affects the driving of the own vehicle varies. Therefore, the control device 21 may be configured to distinguish at least two different modes of failure, and to set different reference speeds for the different modes of failure. Upon detecting a failure of the steering system 11, the vehicle speed is limited to the reference speed corresponding to the detected mode of failure. In such a case also, depending on the nature of the detected failure, the own vehicle may be placed in a safe speed keeping stage or a stop keeping stage.

If two modes of failure occur at the same time, the upper limit speed is set to the lower of the corresponding reference speeds by which the vehicle speed is limited. By selecting the lowest of the reference speeds in case of detecting multiple modes of failure, the reliability of the vehicle can be further enhanced.

In addition, when the vehicle speed is lowered by the driver's brake operation below the current upper limit speed set in the forced deceleration stage, the vehicle speed may be controlled so as to set the current vehicle speed as the upper limit speed.

The present invention has been described in terms of specific embodiments, but is not limited by such embodiments, and can be modified in various ways without departing from the scope of the present invention. Further, the various components shown in the above embodiments are not necessarily essential for the present invention, but can be appropriately omitted or substituted. For example, the present invention is applicable not only in connection with failures of steer-by-wire steering systems, but also in connection with failures of over-heating protection devices for steering systems, brake-by-wire brake systems and autonomous driving systems which employ redundant arrangements.

The invention claimed is:

1. A control device for a vehicle equipped with a steering system including an operating member configured to be operated by a driver, and a steering member configured to steer wheels according to displacement of the operating member, wherein upon detecting a failure in the steering system, the control device limits a vehicle speed to a first value, and subsequently limits the vehicle speed to a second value smaller than the first value, the second value maintaining a traveling state of the vehicle.

2. The control device according to claim 1, wherein the steering system includes a redundant arrangement, and the failure in the steering system is a failure in the redundant arrangement.

3. The control device according to claim 2, wherein the steering system includes a reaction force generator that applies a reaction force to the operating member, and a steering device that steers the wheels, and the redundant arrangement is provided in each of the reaction force generator and the steering device, and the failure in the redundant arrangement is detected when a failure is detected in at least one of the reaction force generator and the steering device.

4. The control device according to claim 1, wherein the first value is set as a higher of a legal speed limit of a road on which the vehicle is traveling and a current speed of the vehicle when the failure is detected.

5. The control device according to claim 1, wherein the vehicle speed is limited based on a deceleration of the vehicle that takes place without the driver operating an accelerator pedal or a brake pedal.

6. The control device according to claim 1, wherein in a case where the vehicle is provided with a power generator, and a failure of a power supply system is detected, the control device progressively limits the vehicle speed when the power generator can adequately power the steering system, the control device limits the vehicle speed to a safe speed when the power generator cannot adequately power the steering system, and the control device brings the vehicle to a stop when the power generator is unable to power the steering system.

7. The control device according to claim 1, wherein the control device is configured to distinguish a plurality of modes of failure in the steering system, and

when two or more modes of failure are detected simultaneously, the control device limits the vehicle speed to a lowest of speeds associated with the two or more modes of failure.

8. The control device according to claim 1, wherein the vehicle is further equipped with a power supply system for supplying electric power to the steering system, the power supply system is provided with a redundant arrangement, and the failure in the steering system includes a failure in the redundant arrangement of the power supply system.

9. A control device for a vehicle equipped with a steering system including an operating member configured to be operated by a driver, and a steering member configured to steer wheels according to displacement of the operating member, wherein upon detecting a failure in the steering system, the control device limits a vehicle speed to a first value, and subsequently limits the vehicle speed to a second value smaller than the first value, wherein the vehicle is controlled normally when a power capacity of a power supply system of the vehicle is equal to or higher than a first level, the vehicle is controlled with a first speed determined according to the power capacity of the power supply system when the power capacity of the power supply system is lower than the first level, and equal to or higher than a second level which is lower than the first level, and the vehicle is controlled with a second speed lower than the first speed when the power capacity of the power supply system is lower than the second level.

* * * * *